Aug. 31, 1943.  O. W. PINEO  2,328,293
SPECTROPHOTOMETER MONOCHROMATOR DRIVE
Filed April 29, 1942  3 Sheets-Sheet 2
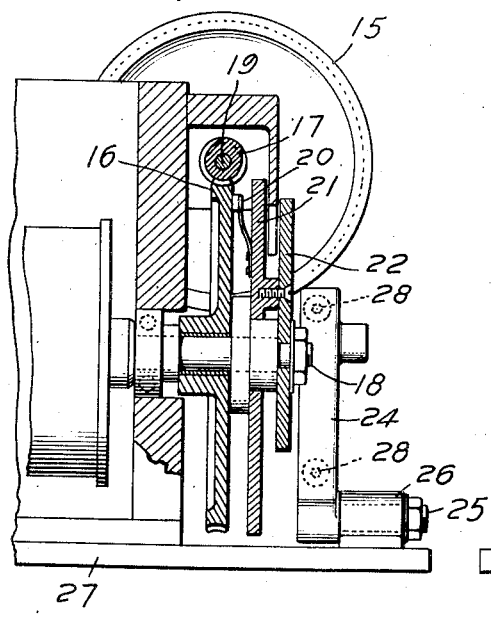
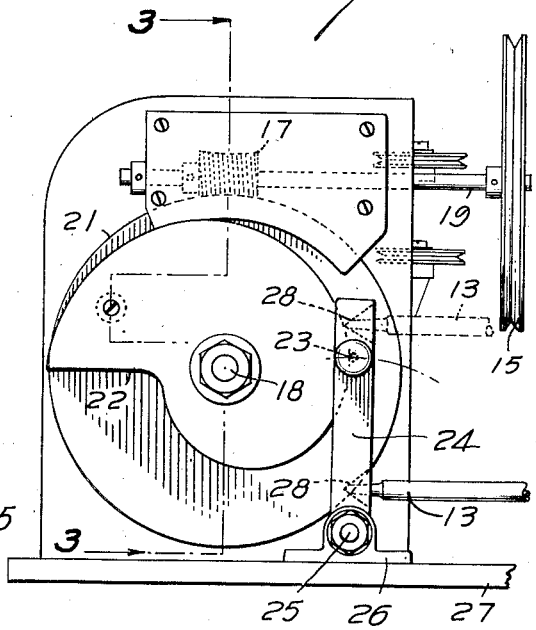
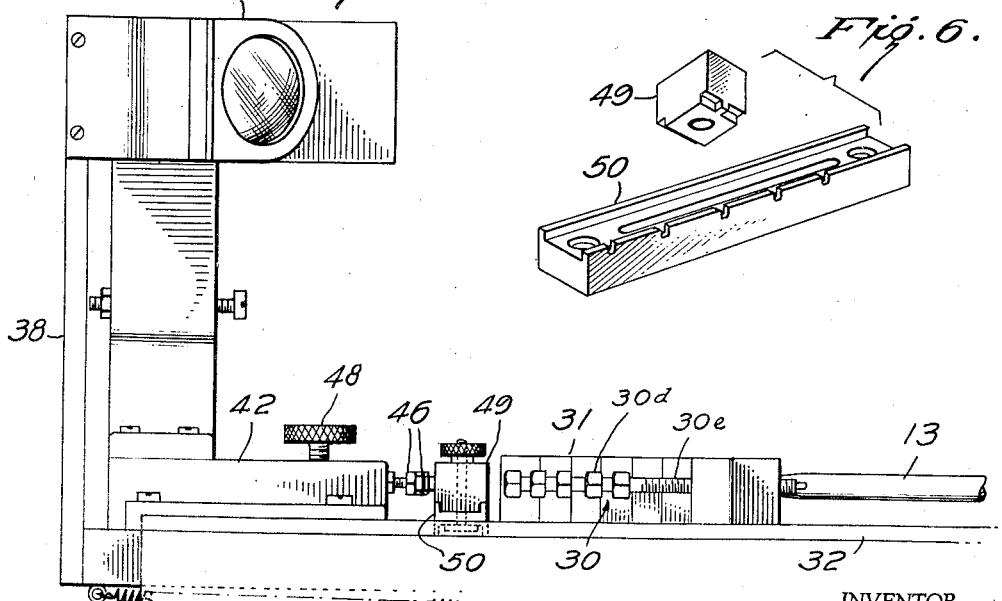
INVENTOR.
ORRIN WESTON PINEO,
BY
Harvey W. Edelblute
ATTORNEY.

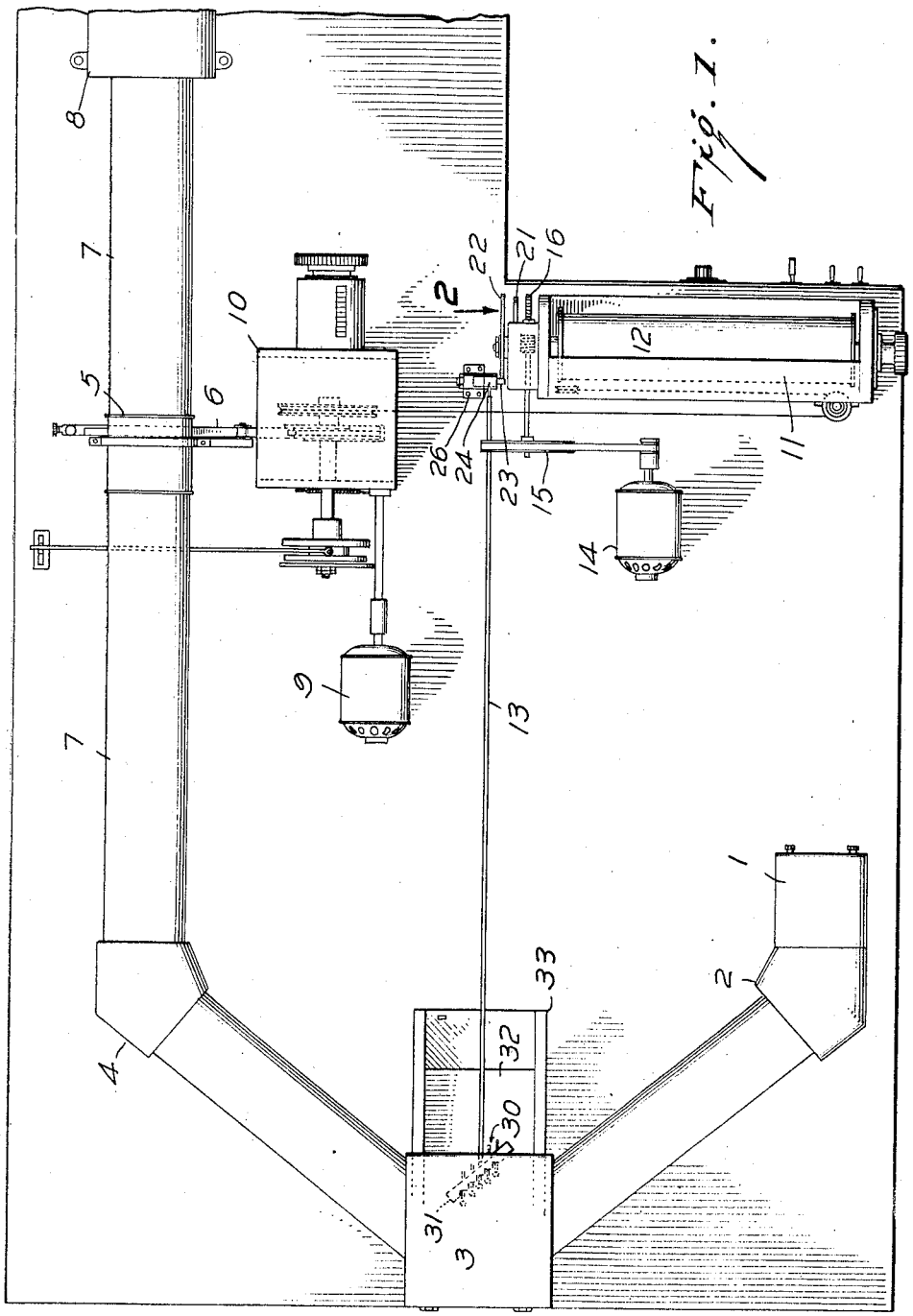

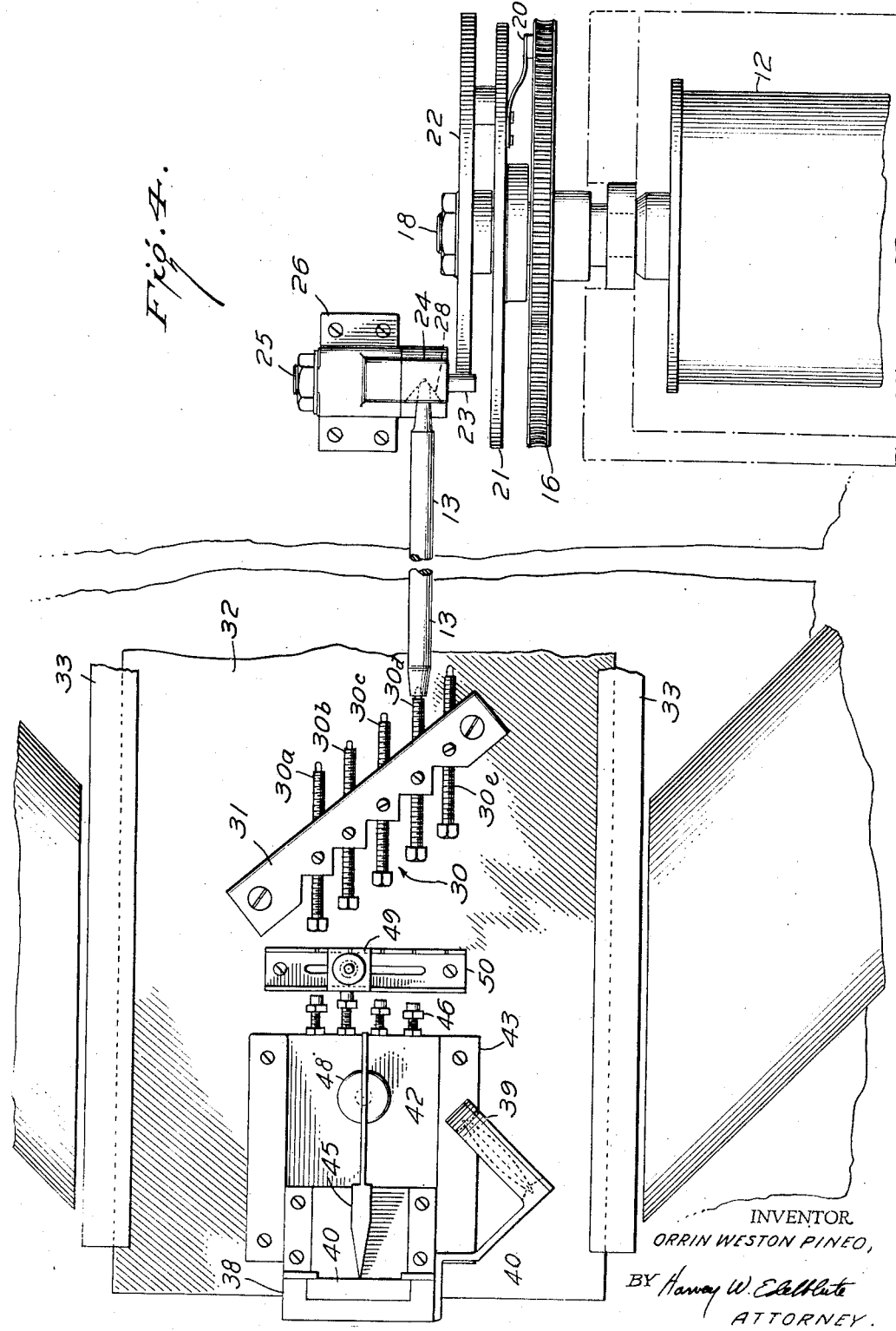

Patented Aug. 31, 1943

2,328,293

UNITED STATES PATENT OFFICE 2,328,293

SPECTROPHOTOMETER MONOCHROMATOR DRIVE

Orrin Weston Pineo, Milo, Maine, assignor to American Cyanamid Company, New York, N. Y., a corporation of Maine Application April 29, 1942, Serial No. 441,036

4 Claims. (Cl. 234—1.5)

This invention relates to improvements in recording spectrophotometers and more particularly to variable ratio drive means connecting the monochromator and recording units of the spectrophotometer.

Recording spectrophotometers are commonly employed to determine the optical properties of an object in either reflecting or transmitting light. The object under examination is subjected to a series of substantially monochromatic light beams and the ratio of the relative intensity of the incident monochromatic beam to the intensity of the light reflected from, or transmitted through, the sample is graphically recorded. The optical characteristics of the objects may be measured over the entire spectral range or over only a particular range as for example in the infra-red, green, or in the ultraviolet. As the relative intensity of the monochromatic beam absorbed by or transmitted by most colored objects varies with the wave length of the light source a curve will be plotted by the recording device one of the coordinates of which represents relative light intensity; the other coordinate plotted represents, of course, the wave length of the monochromatic beam.

It is often desirable in examining objects spectroscopically to obtain graphical representations of its optical characteristics over the entire spectral range. It is also frequently desirable to analyze in greater detail the optical characteristics of the sample over one or more comparatively narrow wave length bands. In my copending application, Serial No. 441,029, filed April 29, 1942, I disclose an improved spectrophotometer transmission connecting a photometering prism and a recording drum which comprises a series of particularly designed cams, any one of which may be readily brought into engagement with a cam follower operating the photometering prism and thereby enable the operator to obtain curves on a recording drum which may be expanded graphically by any desired function in the coordinate representing intensity. The present invention relates to a mechanism connecting the recording device with the monochromator so that it is possible to expand graphically the curve being recorded in the coordinate representing wave length of the light reflected from or transmitted by the object under investigation whereby the sensitivity required in accurate colorimetric work is obtained. The apparatus of the present invention also enables the operator of a spectrophotometer to obtain recorded curves of any particular portion of the spectral range by a very simple adjustment of the apparatus which is quickly and easily made. Although the apparatus of the present invention operates to particularly good advantage in conjunction with the improved transmission mechanism described in my above mentioned application it is to be understood of course that it may be used without regard to any particular transmission.

The invention will be described in greater detail with reference to the accompanying drawings which illustrate a preferred modification of my apparatus in a spectrophotometer of the flickering beam type. It is understood, however, that the variable ratio monochromator drive of the present invention may be used to good advantage with any recording spectrophotometer employing a recording device and a variable slit monochromator.

Fig. 1 is a plan view showing portions of a spectrophotometer, including monochromator, recording apparatus, anti-backlash speed reducing device and transmission mechanism;

Fig. 2 is an end view of the recording apparatus taken in the direction of the arrow 2 on Fig. 1 showing the variable ratio monochromator drive with a representative cam profile;

Fig. 3 is a sectional elevation taken on the line 3—3 of Fig. 2 in the direction of the arrows;

Fig. 4 is a plan view of a portion of a monochromator and the variable ratio drive of Fig. 2 with connecting parts broken away;

Fig. 5 is an elevation of the monochromator mirror-slit assembly; and,

Fig. 6 is a perspective of parts of the monochromator slit adjusting means.

Referring to Fig. 1 reference numeral 1 indicates a housing for a light source, condensing lenses and variable slit and housing 2 contains collimating lenses and a prism. The optical system employed in the spectrophotometer about to be described is illustrated in greater detail in Fig. 1 of my Patent No. 2,107,836 dated February 8, 1938, and need not be referred to in great detail here. Light passing through the prism is refracted to produce a prismastic spectrum which enters the monochromator control generally shown at 3. Monochromatic light from the control slit of the monochromator is directed by optical parts in housing 4 into the polarizing photometering prism in the optical system located generally at 5 which is turned by cam followed 6 as described in considerable detail in my copending application above referred to. The plane polarized monochromatic light beam next passes through a Wollaston prism which may be located in the housing 7 where it is separated into two beams plane-polarized at right angles to each other. The two beams then pass through a flickering prism (not shown) mounted in the center of a hollow shaft in the motor of a synchronous motor 8 after which they are directed respectively against a standard and a sample to be measured for reflectance in conjunction with an integrating sphere (not shown) or through a standard and a sample placed ahead of such a sphere when transmission measurements are to be made. When the intensity of light transmitted by or reflected from a sample being analyzed differs from the intensity of the light transmitted by or reflected from the standard, or control sample, there will be a variation, or flickering, of the light in the integrating sphere. This flickering of light is caused to develop an alternating current of the flicker frequency by means of a photoelectric cell and high gain amplifier. The amplified current at flicker frequency is then fed to the armature of the motor 8 which rotates the photometric prism. Further details of the operating of this part of the spectrophotometer are described in my application referred to above and are not claimed as such in the present application.

In analyzing the optical characteristics of the sample over a given spectral range motor 9 operates in response to variations in light intensity at different monochromatic wave lengths and through the spectrophotometer transmission 10 described in my above-mentioned copending application causes a stylus (not shown) on the recording device, generally indicated at 11, to trace a path on coordinate paper wrapped around drum 12. The wave length of the monochromatic light beam which is reflected by or transmitted through an object with any particular intensity is also indicated by the stylus on the coordinate paper which moves under the stylus by virtue of a rotational movement of the drum which is coupled with the monochromator.

The drum 12 is rotated by means of a motor 14 and a suitable speed reduction mechanism such as shown in greater detail in Figs. 2, 3 and 4. In Fig. 3 the grooved pulley 15 turned by motor 14 rotates worm wheel 16 through worm gear 17 and shaft 19 (Fig. 2). The worm wheel 16 is journalled on the shaft 18 of the recording drum in such a way that the drum can be turned independently of the worm wheel. A member 20 in frictional contact with the worm wheel causes disk 21 to rotate with the worm wheel and as the disk 21 is securely fastened to the shaft of the recording drum the recording drum is normally turned by the worm wheel. Because of the frictional engagement of the member 20, however, it is possible to turn the drum by hand when it is desired to reset the drum and monochromator to a desired position.

Securely fastened to the drum shaft is a cam 22 with a follower 23 (Fig. 2) attached to a link 24 pivoted at 25 and secured by a suitable bracket 26 to the base 27 upon which the recording drum may be mounted. The link 24 upon which the cam follower is mounted is provided with two or more pockets 28 which are adapted to receive and hold the monochromator drive rod 13. Ordinarily the pockets are spaced apart on the pivoting link in such relationship that for a given displacement of the cam follower the upper pocket, and drive rod 13, will move approximately five times as far as the drive rod would move when in the lower pocket. Other ratios may of course be provided for. This construction, it is seen, provides either a relatively long or short movement of the rod 13 for a single turn of the recording drum.

Referring now to Fig. 4 in which similar parts are indicated by the same numbers the monochromator drive rod 13, which is relatively long and is shown in part only, is in contact at its other end with one of several adjustable pins 30. These pins are securely held by set screws in a bracket 31 which is in turn securely fastened to a table 32 which is slidably mounted in a base 33. Longitudinal movement of rod 13 will move the table 32 and the various parts mounted thereon. In order to keep the monochromator drive rod in operating position suitable springs 35 (Fig. 5) are provided which urge the table toward the variable ratio drive. The springs, however, permit the operator to move the table by hand so that he may disconnect rod 13 and engage it with any other pair of the pins 30 and pockets 28 or with a rod of different length when it is desired to work in a different part of the spectrum.

Also mounted on table 32 is a support 38 which carries the mounted lens 39 and a vertical mirror 40. A base 42 carrying a knife edge 45 is slidably mounted on table 32 by means of members 43. A series of adjustable stops 46 are also mounted on base 42. A set screw 48 holds the sliding base 42 with its knife edge 45 at its proper distance from the mirror 40 thus providing a slit between the knife edge and the mirror, the width of which depends upon the clearance allowed by a stop block 49 shown in greater detail in Fig. 6. The stop block 49 is fitted in an appropriately designed holder 50 in such manner that it may be readily shifted from side to side allowing the individual stops 46 to contact the member 49 providing a variety of slit widths which may be chosen at will and which may be accurately reproduced.

The general method of operating the apparatus just described is as follows: A sample whose optical characteristics is to be analyzed spectroscopically is placed adjacent to the integrating sphere as described in my earlier mentioned patent and the light source turned on. The light passes through the first prism and is refracted to provide a typical spectrum. This refracted light then passes through the lens 39 and impinges upon the mirror 40. A narrow slit formed between the mirror surface and knife edge 45 allows only a portion of the spectrum to be reflected from the mirror surface and on through the instrument to the sample. The width of the slit is made as narrow as possible under the working conditions of the instrument since greatest accuracy is theoretically obtained when the light contacting the sample under investigation approaches that of a monochromatic beam. However, the light intensity of a purely monochromatic beam is too weak to actuate the instrument and accordingly an approximation must be made which is a compromise between the desirability of employing a monochromatic beam and the necessity of having light of sufficient intensity. Since some objects also reflect or transmit much less light than do other objects it is necessary in such cases to provide a light beam of greater intensity when examining these objects. The width of the slit may be adjusted as needed by the stops 46 and the device shown in Fig. 6 in which stop blocks 49 may be moved from side to side thus allowing the movable table 42 with stops 46 to move into contact therewith at different positions, thus providing slit widths of varying size.

Having selected a suitable slit width for the working conditions of the instrument, one end of the monochromator drive rod 13 is brought into engagement with one of the pins 30, and the other end of the rod is placed in the desired pocket of link 24. The recording drum on which is wrapped a sheet of coordinate paper may then be turned until the stylus rests on a point on the paper which represents the start of the spectral range to be plotted. The cam 22, drive rod 13 and monochromator table 32 also move in response to motion of the recording drum as described. The recording stylus draws on the coordinate paper a line the position of which along the axis of the drum represents the relative intensity of the light transmitted or reflected by the sample with the particular monochromatic beam passed by the monochromator slit. Motor 14 is then set in operation and the recording drum and slit move in synchronism at relative rates depending upon the cam profile and position of the drive rod on the pivoted link 24. With the rod 13 in between a pin 30 and the upper pocket 28 of link 24 a single turn of the recording drum will cause the monochromator slit to traverse a wide portion of the spectrum. As the drum rotates the intensity of the monochromatic light reflected from or transmitted by the sample will vary according to its optical characteristics and a curve will be plotted on the coordinate paper which represents the optical behavior of the sample over the spectral range.

When it is desired to measure the optical behavior of an object over only a relatively narrow spectral band with a high degree of accuracy, the operator merely places one end of the drive rod in a lower pocket on the pivoted link 24 and the other end of the rod in engagement with one of the pins, for example 30b. The placement of the monochromator drive rod in a lower pocket on the pivoted link allows the recording drum to turn with a greatly reduced movement of the table 32 and accordingly the slit formed by the knife edge and mirror traverses only a portion of the spectral band. This enables the operator to obtain a curve over the full surface of the coordinate paper which represents optical behavior of the sample over a narrow wave length band. Placement of the end of the monochromator drive rod on one of the various pins 30 causes the table 32 and the slit to move in a particular portion of the spectral band. For example, when the drive rod contacts pin 30b the slit may traverse the spectral band varying in wave length from 400 to 450mμ. When the drive rod contacts pin 30d as shown in Fig. 4 the curve plotted on the recording drum may start at 600mμ. The operator may thus by a simple and quickly made adjustment analyze a sample over a broad spectral range or over any particular portion thereof with great detail and accuracy. The slit adjusting mechanism shown in Fig. 6 may be employed to adjust the width of the slit for greatest accuracy in the particular spectral range being investigated.

Although I have illustrated and described the operation of my improved variable ratio drive means in considerable detail, it will be understood of course that obvious modifications may be made without departing from the spirit of the invention as defined in the appended claims.

What I claim is:

1. In a recording spectrophotometer comprising a monochromator including members forming a movable slit, a photometering device, a movable recording device and a linkage operative to move said monochromator slit-forming members in response to movement of said recording device, in combination, a variable ratio driving means in said linkage permitting relative movement of the recording device and monochromator slit to be selectively controlled.

2. In a spectrophotometer, in combination, a monochromator having members forming a slit through which substantially monochromatic portions of a spectrum may pass and a means whereby the position of the members forming the slit may be moved to allow passage of successive portions of the spectrum through said slit, a recording device, and variable ratio driving means selectively connecting the recording device and monochromator slit-forming members whereby the relative movement of the recording device and monochromator slit may be selectively controlled.

3. In a spectrophotometer, in combination, a monochromator having members forming a slit through which substantially monochromatic portions of a prismatic spectrum may pass and a means whereby the slit-forming members may be moved to allow passage of successive portions of the prismatic spectrum, a recording device, variable ratio driving means selectively connecting the recording device and the monochromator slit-forming members whereby the relative movement of the recording device and monochromator slit may be selectively controlled, and means to position the slit-forming members with respect to the prismatic spectrum independently of the initial position of said recording device.

4. In a recording spectrophotometer comprising a monochromator including members forming a movable slit, a photometering device, a recording device and a linkage operating to move said monochromator slit-forming members in response to movement of said recording device, in combination, a variable ratio driving means comprising a cam, a pivoted cam follower member, a drive rod operating said movable slit-forming members and adapted to be placed in engagement with said pivoted cam follower member at any one of several points spaced apart from its pivot whereby relative movement of the recording device and monochromator slit may be selectively controlled.

ORRIN WESTON PINEO.